United States Patent Office 2,857,430

Patented Oct. 21, 1958

1

2,857,430

PREPARATION OF UREAS

Fred Applegath, El Dorado, Ark., Marion D. Barnes, Glendale, Mo., and Raymond A. Franz, El Dorado, Ark., assignors to Monsanto Chemical Company, St. Louis, Mo., a corporation of Delaware No Drawing. Application December 31, 1956
Serial No. 631,455

15 Claims. (Cl. 260—553)

This invention relates to urea and substituted ureas and more particularly to an entirely new process for the preparation thereof.

The so-called carbon dioxide process for making urea is the only known process which is being operated commercially. There are a number of modifications to the carbon dioxide process, but only two of these are now in commercial use. The conditions vary from 180° C. and 300 p. s. i. to 210° C. and 6000 p. s. i. and up to 250% excess ammonia above the stoichiometric requirement, the yield of urea under these conditions varying from 40% to 50% per pass. While the carbon dioxide process represents a substantial contribution to the art, it has its drawbacks. One serious drawback is that the cost of constructing and operating the plant is very high because of the high pressure required. Another drawback is that the yields are undesirably low. Still another drawback is the difficult step of recovering the ammonia and carbon dioxide which have not been converted to urea. Furthermore, the corrosion problem is quite serious.

Another urea-making process disclosed in the literature involves reacting carbonyl sulfide and ammonia at 110° C.–120° C. and 300–500 p. s. i. Under these conditions an intermediate product, ammonium thiocarbamate, is formed and converted to urea. Although yields up to 70% are reported for this so-called carbonyl sulfide process, the art has not developed it beyond a test tube scale. One major drawback with the carbonyl sulfide process is the difficulty and cost of producing carbonyl sulfide. Carbonyl sulfide is not available in commercial quantities. Another drawback is that at least one, and preferably both, of the reactants must be liquefied in order to accelerate the reaction.

An object of this invention is to provide an entirely new and substantially better process for making urea and substituted ureas. Another object is to provide a process for making urea and substituted ureas from carbon monoxide, sulfur and either ammonia or an amine or mixtures thereof. Other objects will become apparent from the description of the invention.

It has now been discovered that ureas and substituted ureas can be conveniently and economically prepared by reacting carbon monoxide, sulfur and a compound selected from the group consisting of ammonia, monoprimary-amines and mixtures of either with secondary amines wherein not more than one of the substituents attached to the secondary nitrogen atom is attached thereto through an aromatic carbon atom. The ureas prepared in accordance with the novel process of this invention can be represented by the following formula:

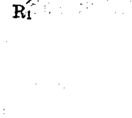

2 wherein A represents

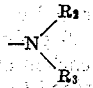

and $-N=B$ and wherein $R_1$ and $R_2$ represent hydrogen, acyclic, alicyclic, heterocyclic and aromatic radicals; $R_3$ represents hydrogen, acyclic, alicyclic and heterocyclic radicals; and B represents an aliphatic group which in conjunction with the nitrogen atom forms a heterocyclic radical.

The examples which follow will serve to illustrate the novel process of this invention. These examples are grouped according to the type of urea produced. In these examples "%" is always percent by weight. In the case of urea, the yield is based on the sulfur charged while in the case of substituted ureas, the yield is based on the amine charged. The yields of urea were determined by the well-known Urease Method. Allowance was made for the ammoniacal nitrogen, which was determined by the formaldehyde method given in A. O. A. C., 7th edition, 1950, page 14, paragraph 2.28.

GROUP I $R_1$, $R_2$, and $R_3$ represent H.

*Example 1.—Urea*

A reaction solution was prepared by mixing together sulfur, hydrogen sulphide, ammonia and methanol. This solution and carbon monoxide were charged concurrently into the base of a stainless steel packed column 7′ tall and 1″ in diameter. A reaction pressure of 250 p. s. i. g. was used, with a solution of urea product together with a gas mixture being withdrawn from the top of the column.

The reaction solution, according to this example, comprised 19.25% sulfur, 24.9% ammonia, 3.52% hydrogen sulfide and 52.3% methyl alcohol as solvent. This solution was fed to the base of the column above described at a rate of 18.7 grams per minute with a feed rate of carbon monoxide of 5.3 grams per minute. The reaction was carried out for a total period of 186 minutes at a temperature of 90° C. As indicated, both a solution of the urea product and a gas mixture were withdrawn from the top of the column. This solution was evaporated substantially to dryness to remove methanol for re-use and to recover the urea product which was analyzed for urea. An 88.7% yield of urea was obtained.

*Example 2.—Urea*

Using the same apparatus and procedure as described in Example 1, a reaction solution comprising 9.37% sulfur, 13.6% ammonia, 3.24% hydrogen sulfide and 73.8% diethylene glycol as solvent was fed to the base of the column above-described at a rate of 5.5 grams per minute, together with 0.65 gram per minute carbon monoxide. The reaction was continued for a total of 215 minutes at a temperature of 100° C. No pressure was applied to the reaction system other than the vapor pressure generated by the reaction mixture. A 7.3% yield of urea was obtained.

*Example 3.—Urea*

A 1.8 liter stainless steel bomb having a working pressure of 400 p. s. i. and provided with a heating element was used as a reactor. To the reactor were charged 11.0 grams of sulfur, 15.0 grams of ammonia, 13.0 grams carbon monoxide and 1.0 gram of hydrogen sulfide, together with 150 ml. of solvent methanol. The bomb was closed and heated at 100° C.–105° C. for about 2¼ hours with agitation. The bomb was then emptied, the contents filtered hot, and the filtrate evaporated substantially to dryness, thereby removing the solvent for re-use and leaving the urea behind as product which was analyzed for urea. An 89% yield of urea was obtained.

*Example 4.—Urea*

Using the same reactor and procedure as described in the preceding example, 11.0 grams of sulfur, 20.0 grams of ammonia, 12.0 grams carbon monoxide and 7.0 grams hydrogen sulfide were charged to the reactor in the presence of 150 ml. diethyl ethanolamine as solvent. A 91% yield of urea was obtained.

*Example 5.—Urea*

Using the same reactor and procedure as described in Example 3, 100 grams of sulfur, 145 grams of ammonia and 110 grams carbon monoxide were charged to the reactor. No solvent or hydrogen sulfide were used. A 61% yield of urea was obtained.

GROUP II $R_1$ and $R_3$ represent H and $R_2$ represents acyclic, alicyclic, heterocyclic and aromatic radicals.

*Example 6.—n-Octylurea*

Using a Parr bomb and the procedure as described in Example 3, 12.8 grams of sulfur, 9.0 grams of ammonia, 38.7 grams of n-octylamine and 14.0 grams of carbon monoxide were charged to the reactor. A 51% yield of n-octylurea was obtained.

*Example 7.—n-Dodecylurea*

Using the same reactor and procedure as described in Example 3, 12.8 grams of sulfur, 10.0 grams of ammonia, 55.5 grams of n-dodecylamine and 14.0 grams of carbon monoxide were charged to the reactor. A 38% yield of n-dodecylurea was obtained.

*Example 8.—n-Octadecylurea*

Using the same reactor and procedure as described in Example 3, 12.8 grams of sulfur, 10.0 grams of ammonia, 40.5 grams of n-octadecylamine and 14.0 grams of carbon monoxide were charged to the reactor. A 87% yield of n-octadecylurea was obtained.

*Example 9.—Phenylurea*

Using the same reactor and procedure as described in Example 3, 13.8 grams of sulfur, 4.0 grams of ammonia, 20.4 grams of aniline and 15.0 grams of carbon monoxide were charged to the reactor. Phenylurea was recovered from the reaction mixture.

*Example 10.—Cyclohexylurea*

Using the same reactor and procedure as described in Example 3, 12.8 grams of sulfur, 10.0 grams of ammonia, 29.7 grams of cyclohexylamine and 14.0 grams of carbon monoxide are charged to the reactor. Cyclohexylurea is obtained.

*Example 11.—2-thiazolylurea*

Using the same reactor and procedure as described in Example 3, 12.8 grams of sulfur, 10.0 grams of ammonia, 30.0 grams of 2-aminothiazole and 14.0 grams of carbon monoxide are charged to the reactor. 2-thiazolylurea is obtained.

GROUP III $R_1$ represents H, $R_2$ represents acyclic, alicyclic, heterocyclic and aromatic radicals and $R_3$ represents acyclic, alicyclic and heterocyclic radicals.

*Example 12.—1,1-dimethylurea*

Using the same reactor and procedure as described in Example 3, 12.8 grams of sulfur, 6.8 grams of ammonia, 18.0 grams of dimethylamine and 14.0 grams of carbon monoxide are charged to the reactor. 1,1-dimethylurea is recovered.

*Example 13.—1-methyl-1-phenylurea*

Using the same reactor and procedure as described in Example 3, 12.8 grams of sulfur, 6.8 grams of ammonia, 43.0 grams of N-methylaniline and 14.0 grams of carbon monoxide are charged to the reactor. 1-methyl-1-phenylurea is recovered.

*Example 14.—1-ethyl-1-(p-chlorophenyl)urea*

Using the same reactor and procedure as described in Example 3, 12.8 grams of sulfur, 6.8 grams of ammonia, 62.0 grams of N-ethyl-p-chloroaniline and 14.0 grams of carbon monoxide are charged to the reactor. 1-ethyl-1-(p-chlorophenyl)urea is recovered.

GROUP IV $R_1$ represents H and B represents an aliphatic which in conjunction with the nitrogen atom forms a heterocyclic radical.

*Example 15.—N-carbamylpiperidine*

Using the same reactor and procedure as described in Example 3, 12.8 grams of sulfur, 6.8 grams of ammonia, 34.0 grams of piperidine and 14.0 grams of carbon monoxide are charged to the reactor. N-carbamylpiperidine is recovered.

GROUP V $R_1$ and $R_2$ represent acyclic, alicyclic, heterocyclic and aromatic radicals and $R_3$ represents hydrogen.

*Example 16.—1,3-dimethylurea*

A 1.8 liter stainless steel bomb having a working pressure of 400 p. s. i. and provided with a heating element, was used as a reactor. The air was partially removed by evacuating the bomb to a pressure of 30–40 mm. Five grams of sulfur and 9.8 grams of gaseous methylamine were charged to the reactor together with 200 ml. methanol as solvent. Carbon monoxide was then pressured into the reactor until the reactor registered a pressure of 70 p. s. i. g. at room temperature. The reactor was then heated for two hours at 120° C. with agitation. After this reaction period, the reactor was vented to remove the by-product $H_2S$. The contents were removed as a methanol solution and evaporated to approximately ⅓ its original volume and chilled to precipitate the excess unreacted sulfur. After filtration, the solution was evaporated to dryness and the crude urea product recrystallized. An 88% yield, based on amine charged, of the compound 1,3-dimethylurea was obtained.

*Example 17*

Using the same apparatus and procedure including 200 ml. methanol as solvent, as described in Example 16 the di-substituted ureas listed in Table 1 which follows were prepared.

4500 p. s. i. and provided with a heating element and agitator, was used as a reactor. The bomb was charged with 64.0 grams of sulfur, 286.0 grams of beta-naphthylamine and 21.7 grams triethylamine. No diluent was employed. Carbon monoxide under an initial pressure of 450 pounds was then charged to the bomb. The closed bomb was heated at 120° C. for 4 hours, the reaction mixture being agitated during the entire period. The bomb was then vented and rinsed out with methanol. The insoluble urea product was separated by filtration, further extracted (washed) with isoamyl alcohol to remove unreacted amine, and dried. A 19.5% yield, based on the beta-naphthylamine charged, of 1,3-bis-(2-naphthyl)urea was obtained. M. P. 288–295° C. M. P. of authentic material is 290–298° C. Mixed M. P. of these was 290–297° C.

*Analysis.*—Percent calculated for $C_{21}H_{16}N_2O$: N, 9.0. Found: N, 8.33.

The novel process of this invention when applied to this species of the invention results in the production of not only 1,3-bis(2-naphthyl)urea but also a good yield of 2-hydroxy-alpha-naphthathiazole represented by the formula:

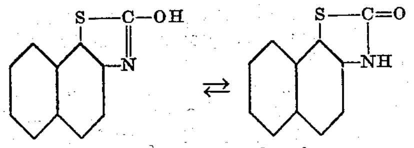

enol form ⇄ keto form

This thiazole can be extracted from the reaction mixture with acetone. Its melting point was determined to be 232°–234° C.

*Example 24.—1,3-bis(1-naphthyl)urea*

Using the same apparatus as in Example 23, the bomb was charged with 215.0 grams of alpha-naphthylamine, 96.0 grams sulfur and 16.6 grams triethylamine to provide the initial reaction basicity. Carbon monoxide under an initial pressure of 500 pounds was then charged to the bomb. The closed bomb was heated at 120° C. for 3.5 hours, the reaction mixture being agitated during the entire period. The bomb was then vented and the reaction product extracted with 15% HCl solution to neutralize excess amine, then with hot ethanol and finally with sodium sulfide solution to extract excess sulfur. The extracted material was then recrystallized from dimethylformamide, giving a 14.3% yield of 1,3-bis(1-naphthyl)-urea. M. P. 289–292° C. M. P. of authentic material 296° C., mixed melting point of these was 293–294° C.

The novel process of this invention when applied to this species of the invention results in the production of not only 1,3-bis(1-naphthyl)urea but also a good yield of 2-hydroxy-beta-naphthathiazole represented by the formula:

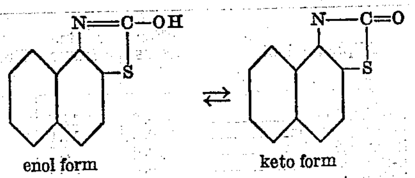

enol form ⇄ keto form

This thiazole can be extracted from the reaction mixture with acetone. Its melting point was determined to be 299° C.

*Example 25.—1,3-bis(alkylphenyl)urea*

Using the same apparatus as in Example 23, 260 grams of an alkylaniline, 64 grams of sulfur, and 15 ml. of triethylamine were introduced, and an initial carbon monoxide pressure of 500 lbs. applied. The alkylaniline contained mixed alkyl groups varying from $C_9$–$C_{15}$, with the $C_{12}$ alkyl group predominating. The alkyl group was substantially para substituted, although some ortho- and meta-substitution was represented in the mixture. The reaction was carried out at 115° C. over a period of 4 hours. At the end of the reaction period, the bomb was emptied and the contents treated with a solvent made up of equal parts of ethylene glycol and isopropanol. The insoluble layer, constituting the product urea, was further treated with petroleum ether to separate traces of unreacted sulfur and alkylaniline. The product urea, dissolved in the petroleum ether was heated to evaporate the ether, leaving a viscous, oily product which was identified by infrared analysis. The product was 1,3-bis(alkylphenyl)urea (Alkyl=$C_9$–$C_{15}$, mostly $C_{12}$ groups which were predominantly para substituted).

*Example 26.—1,3-bis(3-chlorophenyl)urea*

A one liter Magne-Dashe autoclave, having a working pressure of 4500 p. s. i. and provided with a heating element and agitator, was used as a reactor. The autoclave was charged with 17.3 grams of sulfur, 34.4 grams of 3-chloroaniline and 2.7 grams of triethylamine as a reaction initiator. No diluent was employed. Carbon monoxide under an initial pressure of 250 pounds was then charged to the autoclave. The closed autoclave was heated at a temperature of 115° C. for 3.5 hours, the reaction mixture being agitated during the entire period. The autoclave was then vented and rinsed out with methanol. The urea product-methanol mixture was evaporated to a small volume and dilute HCl solution added to dissolve unreacted amine and precipitate the di-aryl urea product which was recovered by filtration. A 39.6% yield, based on aromatic amine charged, of the compound 1,3-bis(3-chlorophenyl)urea was obtained. M. P. 241–242° C., reported M. P. 243° C.

TABLE 3a

| Run No. | Aromatic Amine Compound | Aromatic Amine, Grams | Base (triethylamine) Grams | Sulfur, Grams | CO Pressure, p. s. i. a. | Diluent | Volume of Diluent, ml. | Reaction Time, Hours | Temp., ° C. | Percent Yield Based on Aromatic Amine | Melting Point, ° C. Product | Melting Point, ° C. Literature Ref. |
|---|---|---|---|---|---|---|---|---|---|---|---|---|
| 1 | 2-chloroaniline | 50 | 3.9 | 25.1 | 400 | None | 0 | 3.5 | 115 | 29 | 238–9 | 235–236 |
| 2 | 4-chloroaniline | 34.4 | 2.7 | 17.2 | 250 | Methanol | 50 | 5 | 115 | 65.2 | 292–294 | 270 |
| 3 | 4-aminophenol | 25.0 | 2.3 | 14.7 | 200 | do | 50 | 3.5 | 115 | 92 | 240*d* | 230*d* |
| 4 | ethyl-4-aminobenzoate | 50 | 3.1 | 19.4 | 300 | None | 0 | 3.5 | 115 | 12 | 215 | ---------- |
| 5 | 4-aminobenzoic acid | 25 | 72.0 | 11.7 | 200 | do | 0 | 3.5 | 115 | 34.3 | 290 | 270 |
| 6 | 4-aminobenzonitrile | 35 | 3 | 19 | 300 | do | 0 | 3.5 | 115 | 31.7 | 240*d* | 273 |
| 7 | 4-anisidine | 10 | 1 | 5.2 | 100 | Pyridine | 50 | 3.5 | 115 | 62.6 | 228–230 | 234 |
| 8 | 4-toluidine | 28.9 | 3.6 | 17.2 | 250 | Methanol | 50 | 5 | 115 | 79.4 | 260–262 | 262–263 |
| 9 | 2,4-dimethylaniline | 20 | 1.7 | 10.5 | 200 | do | 50 | 3.5 | 115 | 22.6 | 260 sub. | 262–3 |
| 10 | 2,5-dimethylaniline | 20 | 1.7 | 10.5 | 200 | do | 50 | 3.5 | 115 | 40.6 | 275 sub. | 285 sub. |
| 11 | 2,6-dimethylaniline | 20 | 1.7 | 10.5 | 200 | do | 50 | 3.5 | 115 | 7.7 | 300 | ---------- |
| 12 | aniline | 50 | 7.2 | 34.4 | 500 | None | 0 | 3.5 | 115 | 86.2 | 235–238 | 238–239 |
| 13 | 2-methyl-5-chloroaniline | 50 | 4.0 | 22.7 | 400 | do | 0 | 3.5 | 115 | 25.1 | 265–267 | ---------- |
| 14 | 2-methoxy-5-chloroaniline | 16 | 1.0 | 6.5 | 200 | do | 0 | 3.5 | 115 | 6.3 | 241–242 | ---------- |
| 15 | 4-anisidine | 50 | 4.0 | 26.0 | 400 | do | 0 | 3.5 | 115 | 67.2 | 232–234 | ---------- |
| 16 | do | 50 | None | 26.0 | 400 | do | 0 | 3.5 | 115 | 37.5 | 232–234 | ---------- |
| 17 | N,N-diethyl-p-phenylenediamine. | 37.0 | None | 14.1 | 500 | do | 0 | 4 | 120 | 27 | 212–215 | 223–224 |
| 18 | N,N-dimethyl-p-phenylenediamine. | 10.0 | None | 4.7 | 500 | do | 0 | 4 | 120 | 3 | 233–236 | ---------- |

TABLE 1

| Run No. | Aliphatic Amine | Sulfur Grams | Amine Grams | CO Pressure | Duration of Run Hours | Percent Yield | Temp., ° C. | Product |
|---|---|---|---|---|---|---|---|---|
| 1 | ethylamine | 5.0 | 14.4 | 60 | 2 | 75 | 115 | 1,3-diethylurea. |
| 2 | n-propylamine | 10.0 | 18.9 | 77 | 2 | 71 | 120 | 1,3-di-n-propylurea. |
| 3 | isopropylamine | 10.0 | 17.1 | 73 | 2 | 51 | 120 | 1,3-di-isopropylurea. |
| 4 | n-butylamine | 10.0 | 23.4 | 70 | 2 | 81 | 120 | 1,3-di-n-butylurea. |
| 5 | isobutylamine | 10.0 | 23.4 | 70 | 2 | 80 | 120 | 1,3-di-isobutylurea. |
| 6 | sec-butylamine | 10.0 | 23.0 | 70 | 2 | 71 | 120 | 1,3-di-sec-butylurea. |
| 7 | tert-butylamine | 10.0 | 23.4 | 70 | 2 | 54 | 120 | 1,3-di-tert-butylurea. |
| 8 | n amylamine | 5.0 | 27.7 | 70 | 2 | 61 | 120 | 1,3-di-n-amylurea. |
| 9 | n-hexylamine | 5.0 | 32.3 | 70 | 2 | 71 | 120 | 1,3-di-n-hexylurea. |
| 10 | n-octylamine | 2.5 | 20.7 | 54 | 2 | 84 | 120 | 1,3-di-n-octylurea. |
| 11 | tert-octylamine | 5.0 | 42.0 | 70 | 2 | 29 | 120 | 1,3-di-tert-octylurea. |
| 12 | n-decylamine | 2.5 | 25.2 | 70 | 2 | 70 | 120 | 1,3-di-n-decylurea. |
| 13 | n-dodecylamine | 2.6 | 29.4 | 70 | 2 | 80 | 120 | 1,3-di-n-dodecylurea. |
| 14 | n-tetradecylamine | 10.0 | 34.0 | 70 | 1¾ | 61 | 120 | 1,3-di-n-tetradecylurea. |
| 15 | n-octadecylamine | 1.3 | 21.5 | 53 | 2 | 71 | 120 | 1,3-di-n-octadecylurea. |
| 16 | allylamine | 5.0 | 17.8 | 70 | 2 | 78 | 120 | 1,3-di-allylurea. |
| 17 | methallylamine | 5.0 | 22.8 | 70 | 2 | 54 | 120 | 1,3-dimethallylurea. |
| 18 [1] | α-methylbenzylamine | 2.7 | 20.0 | 70 | ⅓ | 37 | 120 | 1,3-bis(α-methylbenzyl)urea. |
| 19 | benzylamine | 10.0 | 34.3 | 73 | 2 | 62 | 120 | 1,3-dibenzylurea. |
| 20 | cyclohexylamine | 10.0 | 22.7 | 50 | 2 | 63 | 120 | 1,3-dicyclohexylurea. |

[1] The reaction time was 20 minutes.

*Example 18.—1,3-bis(5-carboxyamyl) urea*

A 1.8 liter stainless steel bomb, having a working pressure of 400 p. s. i. and provided with a heating element, was used as a reactor. The bomb was charged with 1.2 grams of surfur, 10 grams of ε-aminocaproic acid and 200 ml. of methanol as diluent. Carbon monoxide was charged to the reactor under an initial pressure of 70 p. s. i. a. The closed bomb was heated at about 120° C. for 2 hours with agitation. The reactor was then emptied and the contents filtered hot. The filtrate was evaporated to dryness on a steam bath leaving behind a crude product containing unreacted amine. The crude product was dissolved in dilute NaOH solution, and acidified with HCl and chilled to precipitate the substituted urea from the thus formed amine hydrochloride solution. Based on the amine charged, a 52% yield of the compound 1,3-bis(5-carboxylamyl)urea was obtained; M. P. 152–155° C.

*Analysis.*—Percent calculated for $C_{13}H_{24}N_2O_5$: C, 53.96; H, 8.36; N, 9.68. Found: C, 54.01; H, 8.44; N, 10.30.

*Example 19.—1,3-bis(3-hydroxypropyl) urea*

Using the equipment set forth in Example 18, 3.2 grams of sulfur; 15.0 grams of 3-hydroxypropylamine, 50 ml of methanol as diluent, and carbon monoxide at an initial pressure of 70 p. s. i. a. were charged to the reactor. The closed bomb was heated at about 120° C. for 2 hours with agitation. The reactor was then emptied and the contents filtered hot. The filtrate was evaporated to a smaller volume and cooled to crystallize out the substituted urea product. Based on the amine charged, a 74% yield of the compound 1,3-bis(3-hydroxypropyl)urea was obtained, M. P. above 80° C.

*Analysis.*—Percent calculated for $C_7H_{16}N_2O_3$: N, 15.9. Found: N, 16.51.

*Example 20.—1,3-bis(2-cyanoethyl) urea*

Using the same equipment set forth in Example 18, 3.4 grams of sulfur, 15.0 grams of β-cyanoethylamine, 200 ml. of methanol as diluent, and carbon monoxide at an initial pressure of 80 p. s. i. a. were charged to the reactor. The closed bomb was heated at about 100° C. for 2 hours with agitation. The reactor was then emptied and the contents filtered hot. The filtrate was evaporated to a smaller volume and cooled to separate out the crude substituted urea product. The crude product was dissolved in methanol, treated with activated charcoal to remove color, and then recrystallized from the methanol to yield a yellow crystalline material, M. P. 144–146° C. Based on the amine charged, a 32% yield of the compound 1,3-bis(2-cyanoethyl)urea was obtained.

*Analysis.*—Percent calculated for $C_7H_{10}N_4O_3$: C, 50.59; H, 6.07; N, 33.72. Found: C, 49.47; H, 5.55; N, 34.25.

*Example 21.—1,3-bis(2-N-morpholinoethyl) urea*

Using the same equipment set forth in Example 18, 4.9 grams of sulfur, 20 grams of N-(2-aminoethyl)-morpholine, 200 ml. methanol as diluent, and carbon monoxide at an initial pressure of 70 p. s. i. a. were charged to the reactor. The closed bomb was heated at about 120° C. for 2 hours with agitation. The reactor was then emptied and the contents filtered hot. The filtrate was evaporated to dryness, leaving behind a dark oil as product. The oil was dissolved in benzene, treated with activated charcoal to remove color, and then recrystallized from the benzene to yield a crystalline product, M. P. 104–106° C. Based on the amine charged, a 60.2% yield of the compound 1,3-bis(2-N-morpholinoethyl)urea was obtained.

*Analysis.*—Percent calculated for $C_{13}H_{26}N_4O_3$: C, 54.52; H, 9.15; N, 19.56. Found: C, 54.39; H, 8.69; N, 19.01.

*Example 22.—1,3-difurfurylurea*

Using the same equipment set forth in Example 18, 5.0 grams of sulfur, 10 grams of furfurylamine, 100 ml. of methanol as diluent, and carbon monoxide at an initial pressure of 75 p. s. i. a. were charged to the reactor. The closed bomb was heated at about 120° C. for 2 hours with agitation. The reactor was then emptied and the contents filtered hot. The filtrate was evaporated substantially to dryness, leaving behind crude product. The crude product was recrystallized from water to yield a crystalline material, M. P. 126–129° C. Based on the amine charged, a 73.0% yield of the compound 1,3-difurfurylurea was obtained.

*Analysis.*—Percent calculated for $C_{11}H_{12}N_2O_3$: N, 12.7. Found: N, 11.99.

Table 2 which follows lists a number of bis-aliphatic substituted ureas which may be prepared according to our process in addition to those prepared as set forth in the preceding Table 1 and examples. These further compounds are not intended to encompass a listing of all the ureas of this type which can be prepared, but are presented for illustrative purposes only.

TABLE 2

| Reactant Amine | Product |
|---|---|
| 3-isopropoxypropylamine | 1,3-bis(3-isopropoxypropyl)urea. |
| 3-methoxypropylamine | 1,3-bis(3-methoxypropyl)urea. |
| p-methoxybenzylamine | 1,3-bis(p-methoxybenzyl)urea. |
| β-alanine | 1,3-bis(2-carboxyethyl)urea. |
| N-acetoethylenediamine | 1,3-bis(2-acetamidoethyl)urea. |

*Example 23.—1,3-bis(2-naphthyl) urea*

A two liter Parr bomb, having a working pressure of

TABLE 3*b*

| Run No. | Aromatic Amine | Substituted Urea |
|---|---|---|
| 1 | 2-chloroaniline | 1,3-bis(2-chlorophenyl)urea. |
| 2 | 4-chloroaniline | 1,3-bis(4-chlorophenyl)urea. |
| 3 | 4-aminophenol | 1,3-bis(4-hydroxyphenyl)urea. |
| 4 | ethyl-4-aminobenzoate | 1,3-bis(4-carbethoxyphenyl)urea. |
| 5 | 4-aminobenzoic acid | 1,3-bis(4-carboxyphenyl)urea. |
| 6 | 4-aminobenzonitrile | 1,3-bis(4-cyanophenyl)urea. |
| 7 | 4-anisidine | 1,3-bis(4-methoxyphenyl)urea. |
| 8 | 4-toluidine | 1,3-bis(4-methylphenyl)urea. |
| 9 | 2,4-dimethylaniline | 1,3-bis(2,4-dimethylphenyl)urea. |
| 10 | 2,5-dimethylaniline | 1,3-bis(2,5-dimethylphenyl)urea. |
| 11 | 2,6-dimethylaniline | 1,3-bis(2,6-dimethylphenyl)urea. |
| 12 | aniline | 1,3-diphenylurea. |
| 13 | 2-methyl-5-chloroaniline | 1,3-bis(2-methyl-5-chlorophenyl)urea. |
| 14 | 2-methoxy-5-chloroaniline | 1,3-bis(2-methoxy-5-chlorophenyl)urea. |
| 15 | 4-anisidine | 1,3-bis(4-methoxyphenyl)urea. |
| 16 | do | Do. |
| 17 | N,N-diethyl-p-phenylenediamine. | 1,3-bis(4-diethylaminophenyl)urea. |
| 18 | N,N-dimethyl-p-phenylenediamine. | 1,3-bis(4-dimethylaminophenyl)urea. |

Using the same reactor, a number of additional substituted di-aromatic ureas were similarly prepared. The process data covering these runs is set forth in Table 3*a*. Runs 17 and 18 were carried out in a 440 ml. mild steel bomb having a working pressure of 750 p. s. i. Table 3*b* sets forth the urea product obtained corresponding to the runs of Table 3*a*. In some cases the product urea was insoluble in the methanol used to rinse out the autoclave, in which case the urea product was recovered by simple filtration.

*Example 27.—1-ethyl-3-methylurea*

Using the same reactor and procedure as described in Example 26, 8.0 grams of sulfur, 7.8 grams of methylamine, 11.2 grams of ethylamine and 8.4 grams of carbon monoxide are charged to the reactor. 1-ethyl-3-methylurea is recovered.

*Example 28.—1-cyclohexyl-3-phenylurea*

Using the same reactor and procedure as described in Example 26, 16.0 grams of sulfur, 19.8 grams of cyclohexylamine, 23.2 grams of aniline and 8.4 grams of carbon monoxide are charged to the reactor. 1-cyclohexyl-3-phenylurea is recovered.

GROUP VI $R_1$ and $R_2$ represent acyclic, alicyclic, heterocyclic and aromatic radicals and $R_3$ represents acyclic, alicyclic and heterocyclic radicals.

*Example 29.—1,1-dimethyl-3-phenylurea*

A 1.8 liter stainless steel bomb, having a working pressure of 400 p. s. i. a. and provided with a heating element, was used as a reactor. The bomb was charged with 13.8 grams of sulfur, 20.0 grams of aniline, and 29.0 grams of dimethylamine. Methanol was added as a diluent, 77 ml. being used. Carbon monoxide was charged to the reactor under an initial pressure of 100 p. s. i. The closed bomb was heated at about 100° C. for approximately 2 hours with agitation. The reactor was then emptied and the contents filtered hot. The filtrate was evaporated to a small volume, leaving behind a slurry containing crude substituted urea. The crude slurry was mixed with 400 ml. hot water to dissolve unreacted amine and the substituted urea. This solution was then chilled to precipitate the substituted urea which was then recovered by filtration. Based on the primary amine, a yield of 79.0% of 1,1-dimethyl-3-phenylurea was obtained; M. P. found: 131–133° C.; reported M. P.: 134° C.

*Example 30.—1-(4-carboxyphenyl)-3,3-dimethylurea*

Using the same equipment and procedure set forth in Example 29, 10.0 grams of 4-aminobenzoic acid, and 9.9 grams of dimethylamine were charged to the reactor after introducing 4.7 grams of sulfur. Thirty-three ml. of methanol was used as diluent, and carbon monoxide at an initial pressure of 100 p. s. i. a. was introduced. Reaction temperature and time were as previously described, and the substituted urea was also recovered as described, except that the crude slurry was acidified with dilute hydrochloric acid solution, to dissolve the unreacted amine and to precipitate the urea. A 44.8% yield, based on primary amine, of 1-(4-carboxyphenyl)-3,3-dimethylurea was obtained; M. P. 212–216° C.

*Analysis*.—Percent calculated for $C_{10}H_{12}O_3N_2$: C, 57.68; H, 5.81; N, 13.45. Found: C, 57.69; H, 5.96; N, 13.08.

*Example 31.—1,1-dimethyl-3-(4-hydroxyphenyl)urea*

Using a 2 liter stainless steel Parr bomb equipped with a heater and agitator, 55.0 grams of 4-aminophenol, and 73.0 grams of dimethylamine were charged to the reactor together with 32.0 grams of sulfur, carbon monoxide at an initial pressure of 500 p. s. i. a., and 300 ml. of methanol as diluent. After 2 hours' reaction time at 100° C. with agitation, the reaction mixture was removed from the bomb and evaporated to a paste. The paste was slurried with 200 ml. toluene, filtered, washed with 60–70° C. hexane and dried. A 63.7% yield of 1,1-dimethyl-3-(4-hydroxyphenyl)urea was obtained having a melting point of 195–197° C. The product was a light, cream colored, long needled crystalline solid.

*Example 32.—1,1-dimethyl-3-(4-dimethylaminophenyl)urea*

Proceeding as in Example 29, 4.7 grams of sulfur, 9.9 grams of dimethylamine, and 10.0 grams of 4-N-dimethylaminoaniline, and carbon monoxide at 100 p. s. i. a. initial pressure were mixed with 26 ml. of methanol as diluent. Using the same reaction period and similar conditions of recovery, a 93.0% yield based on primary amine of the compound 1,1-dimethyl-3-(4-dimethylaminophenyl)urea was obtained; M. P. 173–174° C.

*Analysis*.—Percent calculated for $C_{11}H_{17}ON_3$: C, 63.74; H, 8.23; N, 20.28. Found: C, 63.46; H, 8.33; N, 20.06.

*Example 33.—1-(4-carbethoxyphenyl)-3,3-dimethylurea*

The compound of 1-(4-carbethoxyphenyl)-3,3-dimethylurea was prepared according to the procedure of Example 30. Forty grams of ethyl-4-aminobenzoate, 34.4 grams of dimethylamine, 15.5 grams of sulfur and carbon monoxide under an initial pressure of 155 p. s. i. a. were mixed with 50 ml. of ethanol as diluent. The reaction was carried out with agitation for 2 hours at 100° C. The urea was separated from the reaction mixture as described, with a yield of 35.4% based on primary amine being obtained; M. P. 144–146° C.

*Analysis*.—Percent calculated for $C_{12}H_{16}O_3N_2$: C, 60.90; H, 6.82; N, 11.84. Found: C, 60.96; H, 6.87; N, 11.43.

Table 4 which follows lists process data for a number of additional ureas prepared in a manner similar to that described in the preceding examples.

TABLE 4

| Pri. Amine | Sec. Amine | Pri. Amine, Grams | Sec. Amine, Grams | Sulfur, Grams | CO Pressure, p. s. i. a. | Diluent | Volume Diluent, ml. | Yield Based on Pri. Amine | Product, M. P., ° C. | Product, B. P., ° C. |
|---|---|---|---|---|---|---|---|---|---|---|
| 4-toluidine | dimethylamine | 22.9 | 29.0 | 13.8 | 100 | methanol | 77 | 54.0 | 149–152 | |
| 4-chloro aniline | do | 27.3 | 29.0 | 13.8 | 100 | do | 77 | 85.5 | 169–171 | |
| 4-anisidine | do | 13.2 | 14.5 | 6.9 | 100 | do | 40 | 87.5 | 130–131 | |
| aniline | di-n-butylamine | 14.4 | 10.0 | 7.4 | 115 | none | 0 | 91.5 | 69–73 | |
| 2-chloroaniline | dimethylamine | 27.4 | 29.0 | 13.8 | 100 | methanol | 77 | 22.7 | 104–106 | |
| 3-chloroaniline | do | 27.4 | 29.0 | 13.8 | 100 | do | 77 | 56.6 | 144–146 | |
| 1-naphthylamine | do | 30.8 | 29.0 | 13.8 | 100 | do | 77 | 77.5 | 164–166 | |
| 2-naphthylamine | do | 30.8 | 29.0 | 13.8 | 100 | do | 77 | 92.0 | 203–204 | |
| 3,4-dichloroaniline | do | 34.7 | 33.0 | 13.7 | 125 | do | 77 | 62.0 | 153–154 | |
| aniline | di-n-octa-decylamine | 7.5 | 14.0 | 1.85 | 100 | benzene | 20 | 55.0 | 174–176 | |
| 2–5 dimethoxyaniline | dimethylamine | 16.5 | 14.5 | 6.9 | 100 | methanol | 40 | 23.0 | 50–53 | |
| 2-methoxy-5-chloroaniline | do | 30.5 | 26.1 | 12.5 | 110 | do | 80 | 17.5 | 63–66 | |
| aniline | morpholine | 7.4 | 25.0 | 5.0 | 100 | do | 50 | 50.0 | 156–159 | |
| 2,4-dimethylaniline [1] | dimethylamine | 20.0 | 22.4 | 16.0 | 200 | do | 15 | 81.3 | 133–136 | |
| 2,5-dimethylaniline [1] | do | 20.0 | 22.4 | 16.0 | 200 | do | 15 | 68.4 | 87 | |
| 2,6-dimethylaniline [1] | do | 20.0 | 22.4 | 16.0 | 200 | do | 15 | 40.0 | 133–134 | |
| 4-chloroaniline | morpholine | 10.0 | 25.0 | 5.0 | 100 | do | 50 | 66.0 | 196–200 | |
| Do | diallylamine | 32.3 | 24.0 | 16.0 | 500 | do | 300 | 17.3 | 73–74 | |
| methylamine [2] | dimethylamine | 31 | 45 | 32 | 650 | do | 200 | 6 | ---------- | 232–3 @ 760 mm. |
| isobutylamine [2] | diethylamine | 14.6 | 29.2 | 6.4 | 215 | do | 200 | 12 | ---------- | 135–8 @ 8 mm. |
| ethylamine [2] | di-n-butylamine | 17.5 | 48.5 | 12.8 | -------- | do | 300 | 26 | ---------- | 128–31 @ 5 mm. |
| n-hexylamine [2] | diethylamine | 20.2 | 29.2 | 6.4 | 215 | do | 200 | 13 | ---------- | 135–40 @ 10 mm. |
| β-aminopropionic acid | di-n-butylamine | 10 | 29 | 7.2 | 150 | do | 25 | 36 | 85 | |
| n-butylamine [2] | di-isobutylamine | 11 | 38.7 | 4.8 | 215 | do | 200 | 13 | ---------- | 130–5 @ 13 mm. |
| cyclohexylamine | di-n-propylamine | 20 | 40.9 | 12.9 | 140 | none | 0 | 87 | 82.4 | |
| n-hexylamine [2] | do | 20.2 | 40.4 | 6.4 | 215 | methanol | 200 | 11 | ---------- | 130–160 @ 10 mm. |
| n-butylamine | di-n-butylamine | 22 | 39 | 16 | 140 | do | 300 | 27 | ---------- | 140–150 @ 5 mm. |
| n-hexylamine [2] | di-isobutylamine | 22.2 | 51.6 | 6.4 | 215 | do | 200 | 11 | ---------- | 110–20 @ 13 mm. |
| n-octylamine [2] | do | 12.9 | 51.6 | 6.4 | 215 | do | 200 | 18 | ---------- | 125–30 @ 13 mm. |
| n-hexylamine [2] | dibenzylamine | 10.1 | 39.4 | 3.2 | 215 | do | 200 | 15 | ---------- | 190–2 @ 12 mm. |

NOTE.—Reaction time was 2 hours in each run. Reaction temperature was 100° C. unless otherwise noted.

[1] Reaction temperature was 115° C.
[2] Reaction temperature was 120° C.

As is to be seen from the preceding examples the novel process of this invention is subject to wide application. Our study indicates that the stoichiometry of the reaction involved is according to the equation:

$$2R{-}NH_2 + CO + S \longrightarrow RHN{-}\underset{\displaystyle \overset{\|}{O}}{C}{-}NHR + H_2S$$

When urea is the desired product, ammonia is the reactant. Use of mono-primary-amines and mixtures of mono-primary-amines with ammonia or secondary amines in place of ammonia alone results in the formation of mono-, di- and trisubstituted ureas in accordance with the general formula hereinbefore set forth. It is seen according to said formula that tetrasubstituted ureas and 1,1-diaryl substituted ureas cannot be prepared according to the process of this invention.

As previously mentioned, the reaction is carried out by reacting carbon monoxide and sulfur with ammonia or a mono-primary-amine or mixtures of either with a secondary amine. By "mono-primary-amine" is meant a compound containing only one reactive —$NH_2$ group but permitting the presence of other substituent groups which are not deleteriously reactive under the conditions of this reaction.

The mono-primary-amine which can be employed in the practice of this invention may be described in more detail by the general formula $R_4$—$NH_2$ wherein $R_4$ is selected from the group consisting of acyclic, alicyclic, heterocyclic and aromatic radicals. Such radicals include alkyl, aryl (both phenyl and naphthyl), cycloalkyl, alkenyl, 5-membered and 6-membered heterocyclic radicals having at least one atom in the ring selected from oxygen, sulfur and nitrogen. Such radicals as these can be unsubstituted or substituted with one or more substituent groups which are not deleteriously reactive under the conditions of this reaction. By the expression "groups which are not deleteriously reactive under the conditions of this reaction" is meant groups which do not prevent the formation of any of the desired urea. Such substituent groups include alkyl, aryl, cycloalkyl, alkenyl, carboxy, hydroxy, thiol, cyano, nitro, halogen including chlorine, bromine, fluorine and iodine, alkoxy, aryloxy, organosilyl, polysiloxanyl, alkylamino, dialkylamino, etc.

The position of the substituent groups with respect to the amino group in the radical to which they are attached has some effect on the reactivity of the mono-primary-amine. Substituent groups either α or ortho to the primary amino group reduce but do not completely prevent the reactivity of the amine to form the ureas of this invention. In certain instances, a competitive reaction takes place and it is possible to obtain not only the ureas of this invention but mixtures of ureas with other products. Such is the case when thiol, hydroxy and alkylamino substituent groups are α or ortho to the primary amine group. In such cases, azoles are formed along with the substituted ureas as illustrated by the following equations where X represents SH, OH and alkylamino groups:

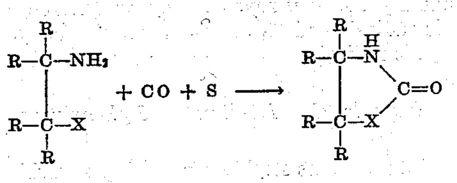

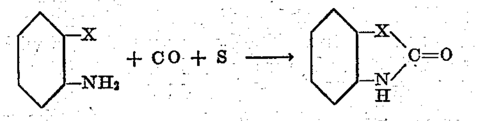

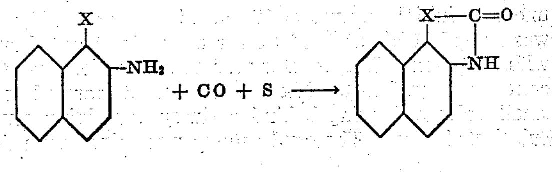

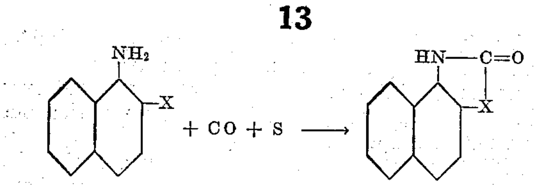

The secondary amine which can be employed in the practice of this invention may be described in more detail by the general formulas

or HN=Y wherein $R_5$ represents acyclic, alicyclic, heterocyclic and aromatic radicals; $R_6$ represents acyclic, alicyclic and hetero-cyclic radicals; and Y represents an aliphatic group which in conjunction with the nitrogen atom forms a heterocyclic radical. Such radicals include alkyl, aryl (both phenyl and naphthyl), cycloalkyl, alkenyl, 5-membered and 6-membered heterocyclic radicals having at least one atom in the ring selected from oxygen, sulfur and nitrogen. Such radicals as these can be unsubstituted or substituted with one or more substituent groups which are not deleteriously reactive under the conditions of the reaction. By the expression "groups which are not deleteriously reactive under the conditions of the reaction" is meant groups which do not prevent the formation of any of the desired urea. Such substituent groups include alkyl, aryl, cycloalkyl, alkenyl, carboxy, hydroxy, thiol, cyano, nitro, halogen including chlorine, bromine, fluorine and iodine, alkoxy, aryloxy, organo-silyl, polysiloxanyl, alkylamino, dialkylamino, etc.

The preparation of urea by the reaction of carbon monoxide, sulfur and ammonia, the preparation of symmetrical disubstituted ureas by the reaction of carbon monoxide, sulfur and a mono-primary-amine as above described and the preparation of trisubstituted ureas by the reaction of carbon monoxide, sulfur and a mixture of a secondary aliphatic amine and an aromatic mono-primary-amine constitute preferred embodiments of this invention. In these reactions, the use of mono-primary alkylamines containing from 1 to 18 carbon atoms, mono-primary phenylamines and mono-primary naphthylamines are particularly preferred. In the case of secondary amines, dialkylamines, dialkenylamines and heterocyclic six-membered secondary amines wherein the amino nitrogen forms part of the ring structure are preferred.

Although not essential, it is desirable in most cases to carry out the process in the presence of an inert solvent or diluent. Aliphatic alcohols, particularly methanol, are preferred for this purpose as they are easy to separate and recover from the urea product, e. g. by evaporation, and they are solvents for many of the amines. Aromatic and aliphatic hydrocarbons, chlorinated hydrocarbons, ethers, tertiary amines and acid amides are also suitable. Water per se is not a satisfactory diluent although small amounts of water in the organic diluent can be tolerated. Where a diluent is employed, an amount sufficient to slurry the reactants is usually sufficient. It is also preferred, but not necessary, to have a diluent in which the reactants are soluble. In preparing ureas of the class described, the use of excessively large amounts of solvent should be avoided.

Although not intended to be limitative, in addition to methanol, the following solvents or diluents have been successfully employed in carrying out the process: ligroin, isopropanol, isopropyl ether, ethanol, mineral oil, trichloroethylene, triethylamine, pyridine, isopropanol-water, ethylene glycol, methyl Cellosolve, tetrahydrofurfuryl alcohol, N,N-dimethylaniline, diethyl ethanolamine, formamide, amyl alcohol, and benzene.

In preparing urea according to the present invention, it is preferred, but not necessary, to employ a small amount of hydrogen sulfide to aid in solubilizing the sulfur where a solvent is employed in the reaction. In the case of the substituted ureas, however, hydrogen sulfide is not necessary nor particularly desirable.

In preparing urea according to the present invention, a solution is prepared by mixing together sulfur, hydrogen sulfide, ammonia and methanol. This solution may be prepared in situ in a closed reaction vessel to which carbon monoxide is charged, or the solution may be fed into the base of a packed column concurrently with carbon monoxide. The product urea is recovered from the reaction mixture by any well-known method and the solvent recovered for re-use.

If desired the ammonia and hydrogen sulfide released from the reactor and from the methanol distillation can be recovered. Although any suitable means may be employed, sulfuric acid may be used to absorb the ammonia as ammonium sulfate, with the sulfur value from the hydrogen sulfide being recovered by well-known partial oxidation methods.

The substituted ureas can be similarly prepared with the appropriate amine being substituted for the ammonia.

In general the novel process of this invention requires no added catalyst. The reaction proceeds in an alkaline medium and in most cases the amines employed provide sufficient alkalinity. In the case of the aryl substituted ureas, an alkaline catalyst, although not absolutely required, has been employed to advantage. This can be illustrated by a series of runs made using the same procedure and conditions disclosed in Example 26.

TABLE 5

| Run No. | Aniline, Grams | Basic Additive | Base, Grams | Sulfur, Grams | CO Pressure, p. s. i. a. | Diluent | Diluent, ml. | Time, Hours | Temp., ° C. | Percent Yield Based on Aniline | Dissociation Constant |
|---|---|---|---|---|---|---|---|---|---|---|---|
| 1 | 20.4 | N,N-diethylaniline | 3.3 | 14.1 | 500 | None | -------- | 4 | 120 | 15 | $3.6\times10^{-8}$ |
| 2 | 20.4 | N,N-diethyl p-toluidine | 3.6 | 14.1 | 500 | do | -------- | 4 | 120 | 34 | $1.2\times10^{-7}$ |
| 3 | 20.4 | triethanolamine | 3.3 | 14.1 | 500 | do | -------- | 4 | 120 | 36 | $5.9\times10^{-7}$ |
| 4 | 20.4 | N,N-dimethylbenzylamine | 3.0 | 13.8 | 500 | do | -------- | 4 | 120 | 26 | $8.5\times10^{-6}$ |
| 5 | 50 | triethylamine | 7.2 | 34.4 | 500 | do | -------- | 3.5 | 115 | 86.2 | $6.4\times10^{-4}$ |
| 6 | 50 | tributylamine | 10.0 | 34.4 | 600 | Methanol | 50 | 5 | 115 | 76.1 | $2.6\times10^{-4}$ |
| 7 | 50 | potassium hydroxide | 3.0 | 34.4 | 600 | do | 50 | 5 | 115 | 61 | ---------- |
| 8 | 50 | sodium hydroxide | 2.4 | 34.4 | 600 | do | 50 | 5 | 115 | 57 | ---------- |
| 9 | 50 | tetraethylammonium hydroxide | 7.9 | 34.4 | 600 | do | 50 | 5 | 115 | 48 | ---------- |
| 10 | 20.4 | calcium methylate | 2.2 | 14.1 | 500 | do | 8 | 4 | 120 | 58 | ---------- |
| 11 | 20.4 | N,N-dimethyloctadecylamine | 6.6 | 14.1 | 500 | None | -------- | 4 | 120 | 64 | ---------- |
| 12 | 20.4 | tri-n-hexylamine | 3.0 | 14.1 | 500 | do | -------- | 4 | 120 | 76 | ---------- |
| 13 | 20.4 | magnesium-methylate | 1.6 | 14.1 | 500 | Methanol | 4 | 4 | 120 | 48 | ---------- |
| 14 | 20.4 | potash sulfurated | 5.9 | 14.1 | 500 | None | -------- | 4 | 120 | 60 | ---------- |
| 15 | 20.4 | sodium oleate | 6.6 | 14.1 | 500 | do | -------- | 4 | 120 | 23 | ---------- |
| 16 | 50 | triethylamine | 7.2 | 34.4 | 500 | do | -------- | 3.5 | 115 | 86.2 | $6.4\times10^{-4}$ |
| 17 | 50 | do | 0.72 | 34.4 | 500 | do | -------- | 3.5 | 115 | 67.4 | $6.4\times10^{-4}$ |
| 18 | 50 | do | 0.36 | 34.4 | 500 | do | -------- | 3.5 | 115 | 48.5 | $6.4\times10^{-4}$ |
| 20 | 50 | do | 0.18 | 34.4 | 500 | do | -------- | 3.5 | 115 | 16.5 | $6.4\times10^{-4}$ |
| 22 | 50 | None | 0.0 | 34.4 | 600 | Methanol | 50 | 5 | 115 | 20.0 | $4.6\times10^{-10}$ |

The reaction was carried out in the presence of a number of different alkaline materials as additives. The urea prepared was 1,3-diphenyl urea. The results obtained and details of the conditions used are given in Table 5. Runs 1–4 and 10–15 were carried out in a 440 ml. mild steel bomb, whereas the remaining runs were carried out in a 1 liter Magne-Dashe bomb.

It will be observed that the highest yields are obtained, using aniline as the reactant aromatic amine, with the addition of a tertiary amine having a basicity corresponding to the dissociation constant of triethylamine. The yields drop with the use of tertiary amines of low basicity. Alkaline catalysts having dissociation constants greater than $1\times10^{-10}$ are preferred. It is to be noted, however, that while in the preparation of this type of urea, an alkaline catalyst is desirable, it is not absolutely necessary. In the absence of added alkaline catalysts of the type discussed herein, the reaction still proceeds but with lower yields.

Strong and weak inorganic bases appear to initiate the reaction about equally as well, although the resulting yields of the urea are inferior to the preferred tertiary amine. Inorganic hydroxides, alkaline inorganic and organic salts and tertiary aliphatic amines are useful as catalysts. Tertiary alkylamines are preferred.

As previously indicated the amount of catalyst to be added to assist in initiating the reaction will vary depending upon the compound selected. In the case of triethylamine, as little as 0.36 gram for 50 grams of reactant aromatic amine was found sufficient to render a fairly good yield of urea. Amounts much below this ratio produced inconsistent results.

The quantities of reactants used in this process can be varied substantially without departing from the scope of the invention. In general at least stoichiometric proportions of reactants should be used, that is a molar ratio of amine:sulfur:carbon monoxide of at least 2:1:1. Excessive quantities of any of the reactants can be used as desired. The process has been found to be particularly operable using molar ratios of amine to sulfur ranging from 0.1:1 to 8:1. Even higher ratios have been used with good results. Generally the particular ratio of reactants will be dictated more by economic considerations than by reactivity considerations. The preceding comments have been concerned with the total molar quantity of amine in the reaction mixture with reference to the sulfur present. When mixtures of primary and secondary amines are used to produce trisubstituted ureas it has been found advantageous to employ the secondary amine in an amount in excess of the stoichiometric proportion in order to prevent the reaction of the primary amine from dominating. Thus when such mixtures are used a mol ratio of secondary amine to primary amine of at least 3:1 is preferred, although a mol ratio of secondary amine to primary amine in the range of from 0.5:1 to 8:1, or even higher, is applicable.

The quantity of carbon monoxide used in the process can be varied substantially with it being employed in excess of the stoichiometric proportion and the excess being governed primarily by the pressure desired.

The process of this invention is operable over an exceptionally wide pressure range. It can be operated at atmospheric pressure although the reaction proceeds much more rapidly at elevated pressures. Generally pressures from about 30 p. s. i. a. (pounds per square inch absolute) to about 1500 p. s. i. a. are applicable. Higher pressures can be used, if desired, but offer no advantage. The preferred pressure will vary with the type of urea produced. In the case of urea and alkyl substituted ureas, pressures ranging from 150 p. s. i. a. to 250 p. s. i. a. are preferred. In the case of diaryl substituted ureas, pressures from 36 p. s. i. a. to about 600 p. s. i. a. are preferred. In the case of trisubstituted ureas, pressures ranging from 50 p. s. i. a. to about 1100 p. s. i. a. have been found to be particularly applicable. In any event, the pressure is not a critical factor.

The process of this invention can be carried out over a wide temperature range. It is preferably carried out at an elevated temperature. Temperatures ranging from about 60° to about 300° C. have been found applicable. Generally, reaction temperatures in the range from about 60° C. to about 160° C. are preferred being varied slightly depending upon the urea produced. In the case of urea and alkyl substituted ureas, a reaction temperature in the range from about 60° to about 160° C. is preferred. In the case of aryl substituted ureas, a reaction temperature ranging from 115° to 130° C. is preferred. Trisubstituted ureas are preferably produced using a reaction temperature ranging from about 85° to about 160° C.

This application is a continuation-in-part of copending application Serial No. 547,565 filed November 17, 1955, now abandoned, copending application Serial No. 553,708 filed December 19, 1955, now abandoned, and copending application Serial No. 594,375 filed June 28, 1956, now abandoned. The last mentioned application was a continuation-in-part of application Serial No. 437,882 filed June 18, 1954, now abandoned, and application Serial No. 553,724 filed December 19, 1955, now abandoned. The process of preparing azoles disclosed herein is disclosed and claimed in copending application Serial No. 630,058 filed December 24, 1956, and Serial No. 646,582 filed March 18, 1957, which were continuations-in-part of application Serial No. 593,040 filed June 22, 1956, now abandoned.

What is claimed:

1. A process for preparing ureas which comprises reacting by mixing at an elevated temperature carbon monoxide, sulfur and a compound selected from the group consisting of ammonia, mono-primary-amines and mixtures of either with secondary amines wherein no more than one of the substituents attached to the secondary nitrogen atom is attached thereto through an aromatic carbon atom.

2. The process as described in claim 1 wherein the reaction is carried out at a temperature in the range of from about 60° to about 300° C.

3. A process for the preparation of urea which comprises reacting carbon monoxide, sulfur and ammonia at an elevated temperature.

4. A process as described in claim 3 wherein the reaction is carried out at a temperature in the range of from about 60° to about 160° C.

5. A process as described in claim 4 wherein the reaction is carried out in the presence of an inert diluent.

6. A process which comprises reacting by mixing carbon monoxide, sulfur and a mono-primary-amine at an elevated temperature.

7. A process as described in claim 6 wherein the mono-primary-amine is a mono-primary-alkylamine.

8. A process as described in claim 6 wherein the mono-primary-amine is 3-hydroxypropylamine.

9. A process which comprises reacting by mixing carbon monoxide, sulfur and a mono-primary-arylamine at an elevated temperature.

10. A process as described in claim 9 wherein the reaction is carried out in the presence of an alkaline catalyst having a dissociation constant greater than $1\times10^{-10}$.

11. A process as described in claim 10 wherein the mono-primary-arylamine is aniline.

12. A process as described in claim 10 wherein the mono-primary-arylamine is naphthylamine.

13. A process for the preparation of substituted ureas which comprises reacting by mixing at an elevated temperature carbon monoxide, sulfur and a mixture of a mono-primary-amine and a secondary amine wherein no more than one of the substituents attached to the secondary nitrogen atom is attached thereto through an aromatic carbon atom.

14. A process as described in claim 13 wherein the mono-primary-amine is a mono-primary-arylamine and the secondary amine is a dialkylamine.

15. A process as described in claim 14 wherein the dialkylamine is dimethylamine and the mono-primary-arylamine is chloroaniline.

References Cited in the file of this patent

Hagelloch: Berichte Chemische Gesellschaft, vol. 83, pages 258 to 261 (1953).

Lewis et al.: J. Am. Chem. Soc., vol. 37, 1915, page 1977.

UNITED STATES PATENT OFFICE
CERTIFICATE OF CORRECTION

Patent No. 2,857,430 October 21, 1958

Fred Applegath et al.

It is hereby certified that error appears in the printed specification of the above numbered patent requiring correction and that the said Letters Patent should read as corrected below.

Column 5, line 28, for "surfur" read -- sulfur --; column 7, line 17, the formula should appear as shown below instead of as in the patent:

$$C_{21}H_{16}N_2O: N, 9.0.$$

columns 11 and 12, TABLE 4, third column thereof, eighteenth item, for "32.3" read -- 32.0 --.

Signed and sealed this 23rd day of August 1960.

(SEAL)
Attest:

KARL H. AXLINE
Attesting Officer

ROBERT C. WATSON
Commissioner of Patents